United States Patent
Takahashi et al.

(10) Patent No.: US 9,050,887 B2
(45) Date of Patent: Jun. 9, 2015

(54) UTILITY VEHICLE

(71) Applicant: KAWASAKI JUKOGYO KABUSHIKI KAISHA, Hyogo (JP)

(72) Inventors: Keiji Takahashi, Akashi (JP); Atsuya Yoshida, Kakogawa (JP); Yuji Kouma, Takasago (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 195 days.

(21) Appl. No.: 13/728,140

(22) Filed: Dec. 27, 2012

(65) Prior Publication Data

US 2014/0183327 A1    Jul. 3, 2014

(51) Int. Cl.
*F16M 13/00*    (2006.01)
*B60K 13/04*    (2006.01)

(52) U.S. Cl.
CPC ...................... *B60K 13/04* (2013.01)

(58) Field of Classification Search
USPC .......... 248/560, 562, 634, 635; 180/291, 377, 180/382; 296/204
See application file for complete search history.

(56) References Cited

U.S. PATENT DOCUMENTS

| 6,402,119 | B1 * | 6/2002 | Miska ........................... 248/613 |
| 6,941,751 | B2 * | 9/2005 | Yamamoto et al. ............. 60/322 |
| 7,575,216 | B2 * | 8/2009 | Zimmermann et al. ...... 248/610 |
| 7,597,173 | B2 * | 10/2009 | Kappich et al. ............... 180/309 |
| 2012/0160588 | A1 | 6/2012 | Takagi |

FOREIGN PATENT DOCUMENTS

JP    2009-13826    1/2009

* cited by examiner

*Primary Examiner* — Steven Marsh
(74) *Attorney, Agent, or Firm* — Wenderoth, Lind & Ponack, L.L.P.

(57) ABSTRACT

A vehicle includes at least: an engine; a transmission arranged on a rear side in a vehicle traveling direction relative to the engine; an exhaust pipe connected to the engine and discharging exhaust gas; and an exhaust muffler connected to a downstream end part of the exhaust pipe. The exhaust muffler is elastically supported on the transmission by an exhaust muffler support member arranged and located between the transmission and the exhaust muffler.

13 Claims, 14 Drawing Sheets

FRONT    REAR

LEFT    RIGHT

UTILITY VEHICLE

BACKGROUND OF THE INVENTION

1. Field of the Invention

The present invention relates to a utility vehicle and, in particular, to a supporting structure for an exhaust system of a utility vehicle.

2. Description of the Prior Art

An example of a vehicle has an exhaust system supporting structure in which an exhaust muffler connected to an engine exhaust pipe is hanged and supported by a plurality of hangers attached to a body (for example, see Japanese Laid-Open Patent Publication No. 2009-13826. The exhaust system supporting structure disclosed in Japanese Laid-Open Patent Publication No. 2009-13826 includes: a body-side hanger bracket fixed to a rear side frame of the body by welding; a muffler-side hanger bracket fixed to the exhaust muffler by welding; and a mount rubber located between the two hanger brackets and supported by these hanger brackets.

Further, in an exhaust system supporting structure for a utility vehicle disclosed in United States Published Patent Application No. 2012/0160588A1, an exhaust pipe located on the exhaust upstream side of the exhaust muffler is supported by an engine mounted on a body frame and the exhaust muffler is supported by a rear side frame of the body. During the running of the vehicle, in general, the body frame and the engine vibrate in mutually different phases. Thus, the exhaust muffler supported by the rear side frame vibrates in a different phase from that of the engine. Meanwhile, in a vehicle like a utility vehicle running in off-road circumstances like a grass field, a gravel field, and a sand field as well as an unpaved mountain path, an unpaved path through a wood, a mud path, and a rocky field, the body frame and the engine vibrate at large amplitudes. Thus, in such a vehicle like a utility vehicle, a supporting structure for an exhaust system is eagerly desired that realizes a situation that the exhaust muffler vibrates in approximately the same phase as the engine.

SUMMARY OF THE INVENTION

The present invention has been devised in view of the above-mentioned problem. An object of the present invention is to provide a supporting structure for an exhaust system that realizes a situation that during the running of a vehicle, the exhaust muffler vibrates in approximately the same phase as the engine.

In order to achieve the above-mentioned object, the present invention provides a supporting structure for an exhaust system of a vehicle employed in an exhaust system of a vehicle including at least: an engine; a transmission arranged on a rear side in a vehicle traveling direction relative to the engine; an exhaust pipe connected to the engine and discharging exhaust gas; and an exhaust muffler connected to a downstream end part of the exhaust pipe, wherein the exhaust muffler is elastically supported on the transmission by an exhaust muffler support member arranged and located between the transmission and the exhaust muffler.

According to the configuration of the present invention, the exhaust pipe and the exhaust muffler vibrate in approximately the same phase as the transmission. This reduces the relative vibration amplitude of the exhaust pipe and the exhaust muffler.

In the present invention, preferably, the exhaust muffler support member includes: a support stay that is attached to the exhaust muffler such as to support the exhaust muffler from an under side and that has a support end part extending from a rear end part of the support stay toward a rear side in the vehicle traveling direction; an elastic cylindrical body extending in the vehicle traveling direction and having an insertion hole into which the support end part of the support stay is inserted; and a transmission mounting bracket attached to the transmission and having a holding part for holding the elastic cylindrical body.

According to the above-mentioned configuration, vibrations in the up and down directions are absorbed by the thickness of the elastic cylindrical body and vibrations in the vehicle traveling direction are absorbed by the insertion of the support end part of the support stay into the insertion hole of the elastic cylindrical body.

In the present invention, preferably, an exhaust upstream end of the exhaust pipe is connected to and supported by an exhaust downstream end of an exhaust manifold connected to an exhaust port of the engine.

According to the above-mentioned configuration, supporting of the exhaust pipe is achieved by the support member of necessary minimum material. This reduces the number of necessary attachment parts.

In the present invention, preferably, the engine is connected via a connecting member to the transmission in an integral manner.

According to the above-mentioned configuration, the exhaust pipe and the exhaust muffler vibrate in approximately the same phase as the engine and the transmission. This reduces relatively the vibration amplitude of the exhaust pipe and the exhaust muffler in comparison with a case that the exhaust pipe and the exhaust muffler are attached to the body frame.

In the present invention, preferably, in order that the exhaust pipe should not interfere with a V-belt type continuously variable transmission arranged on a side of the engine and the transmission, the exhaust pipe extends along an upper part of the V-belt type continuously variable transmission.

According to the above-mentioned configuration, the exhaust pipe is arranged at a high position. This avoids entering of water from the outside and further permits suitable arrangement of the exhaust system in a state that the length of the exhaust pipe is ensured appropriately.

In the present invention, preferably, the engine is a parallel multiple cylinder engine in which a plurality of cylinders are aligned in vehicle width directions.

According to the above-mentioned configuration, the exhaust pipe in a parallel multiple cylinder engine is arranged compactly.

DETAILED DESCRIPTION OF THE PREFERRED EMBODIMENTS

FIGS. 1 to 14 show an example of a utility vehicle 1 employing an exhaust system 40 according to the present invention. An embodiment of the present invention is described below with reference to these drawings. Here, for convenience of description given below, the frontward and the rearward directions with respect to the vehicle traveling direction are respectively adopted as the frontward and the rearward directions of an engine 20 and the other components. Further, in the vehicle width directions, the left and the right directions viewed by a crew member on the vehicle (i.e., the left and the right directions viewed from a rear side of the vehicle) are respectively adopted as the left and the right directions of the vehicle, the engine 20, and the other components.

(Overall Structure of Utility Vehicle 1)

Figure 1:
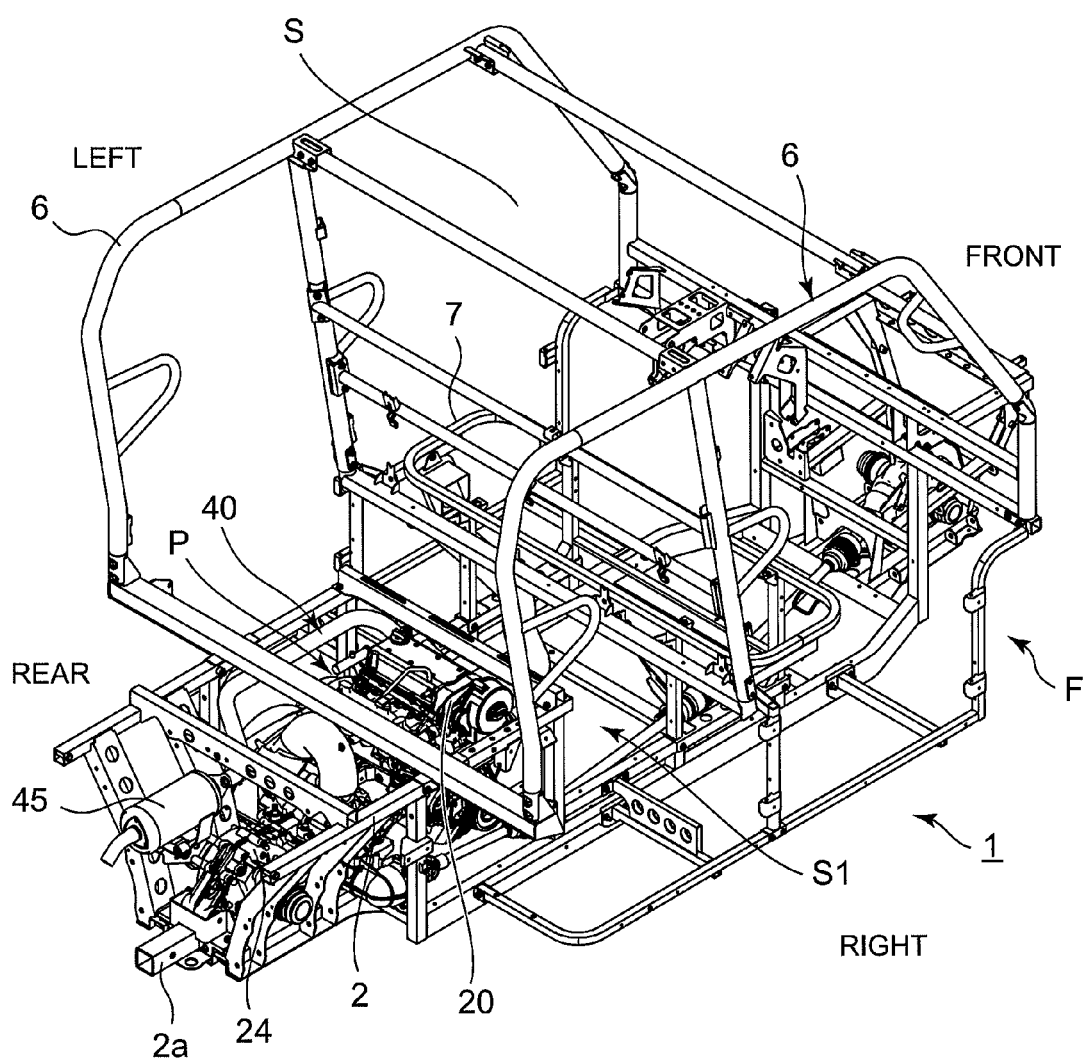
FIG. 1 is a perspective view of a body frame of a utility vehicle according to the present invention, viewed from a rear right side.

FIG. 1 is a perspective view of a body frame F of the utility vehicle 1 viewed from a rear right side. The utility vehicle 1 is mainly used for running in off-road circumstances like a grass field, a gravel field, and a sand field as well as an unpaved mountain path, an unpaved path through a wood, a mud path, and a rocky field. In a rear part of the body frame F, a rear frame 2 for engine mounting and truck box supporting is provided in an integral manner. Inside the rear frame 2, a power unit P having the engine 20 and a gear type transmission 24 is arranged. The power unit P is supported by a lower frame member 2a and the like of the rear frame 2. The power unit P is located in an approximately center part with respect to the vehicle width directions. In an upper part of the body frame F, a ROPS (Roll-Over Protective Structure) 6 is formed that surrounds a cabin space S. In a frontward half part of the cabin space S, a front seat support part 7 is provided. Then, a front seat (not shown) for front crew member is arranged on the front seat support part 7. Under the front seat, a storage box (not shown) is arranged. In the present embodiment, in a front part space S1 within the rearward half part of the cabin space S, a rear seat (not shown) for rear passenger is arranged on a front side of the rear frame 2.

Figure 2:
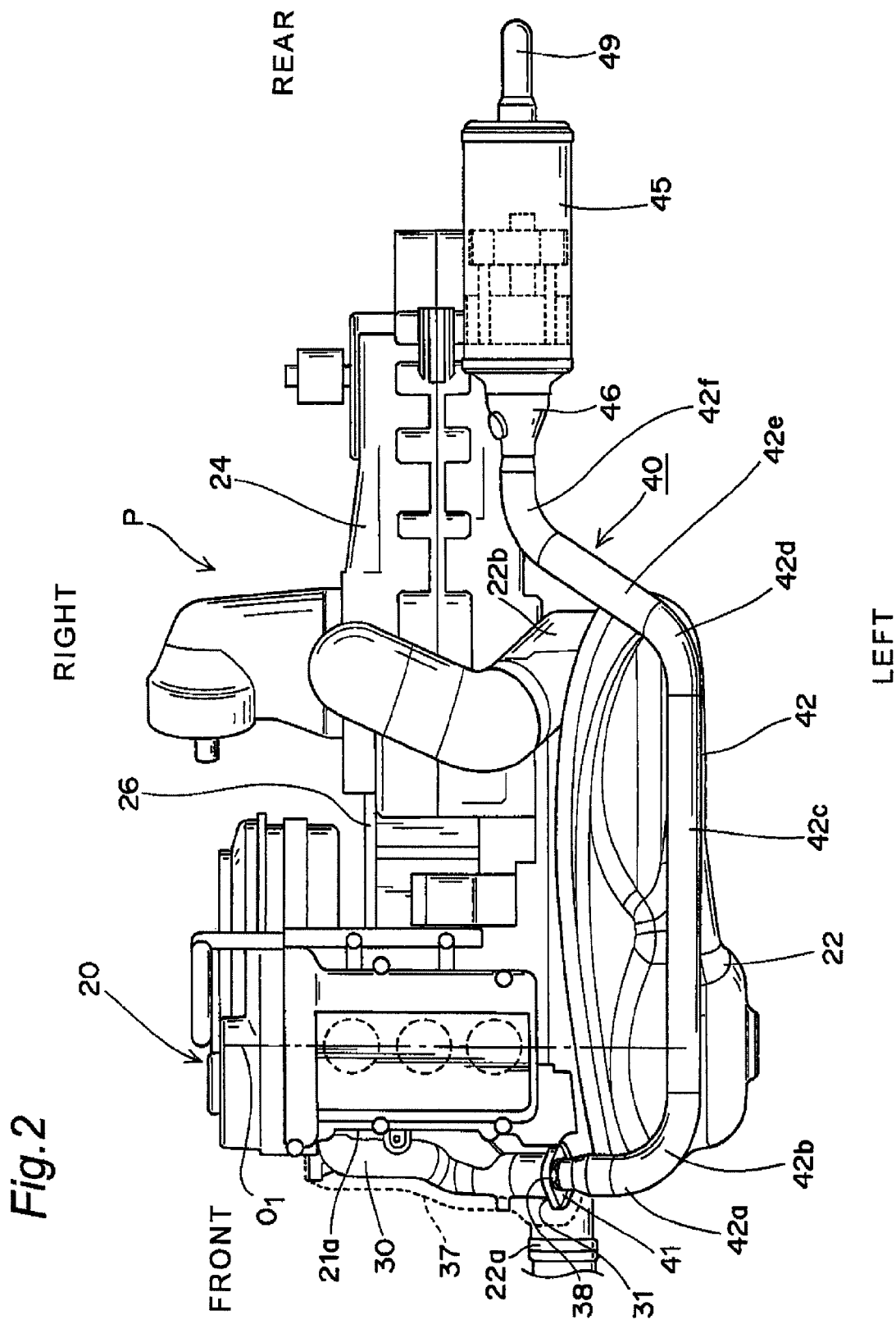
FIG. 2 is a plan view of a power unit and an exhaust system mounted on a body frame shown in FIG. 1.
Figure 3:
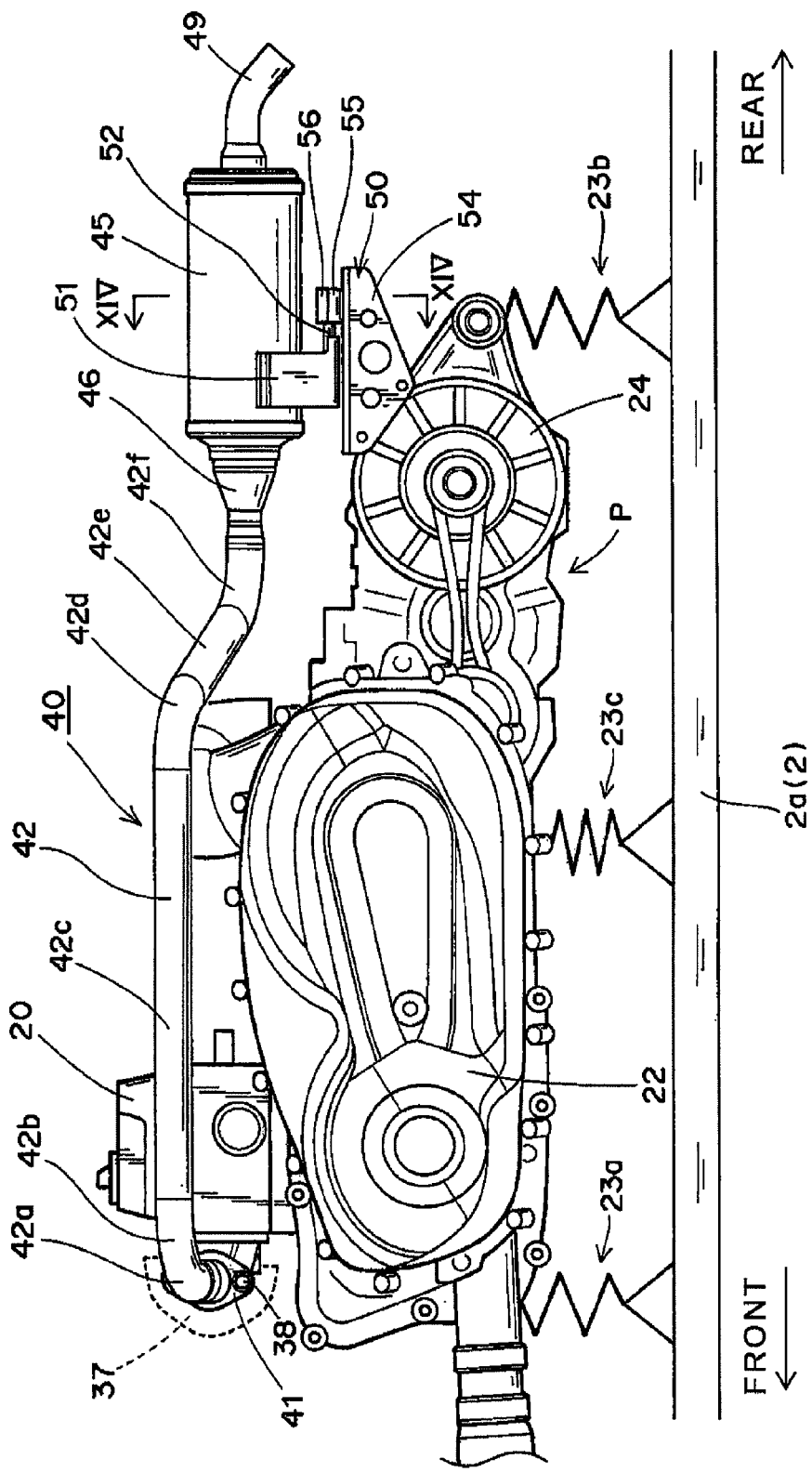
FIG. 3 a left side view of a power unit and an exhaust system shown in FIG. 2.
Figure 4:
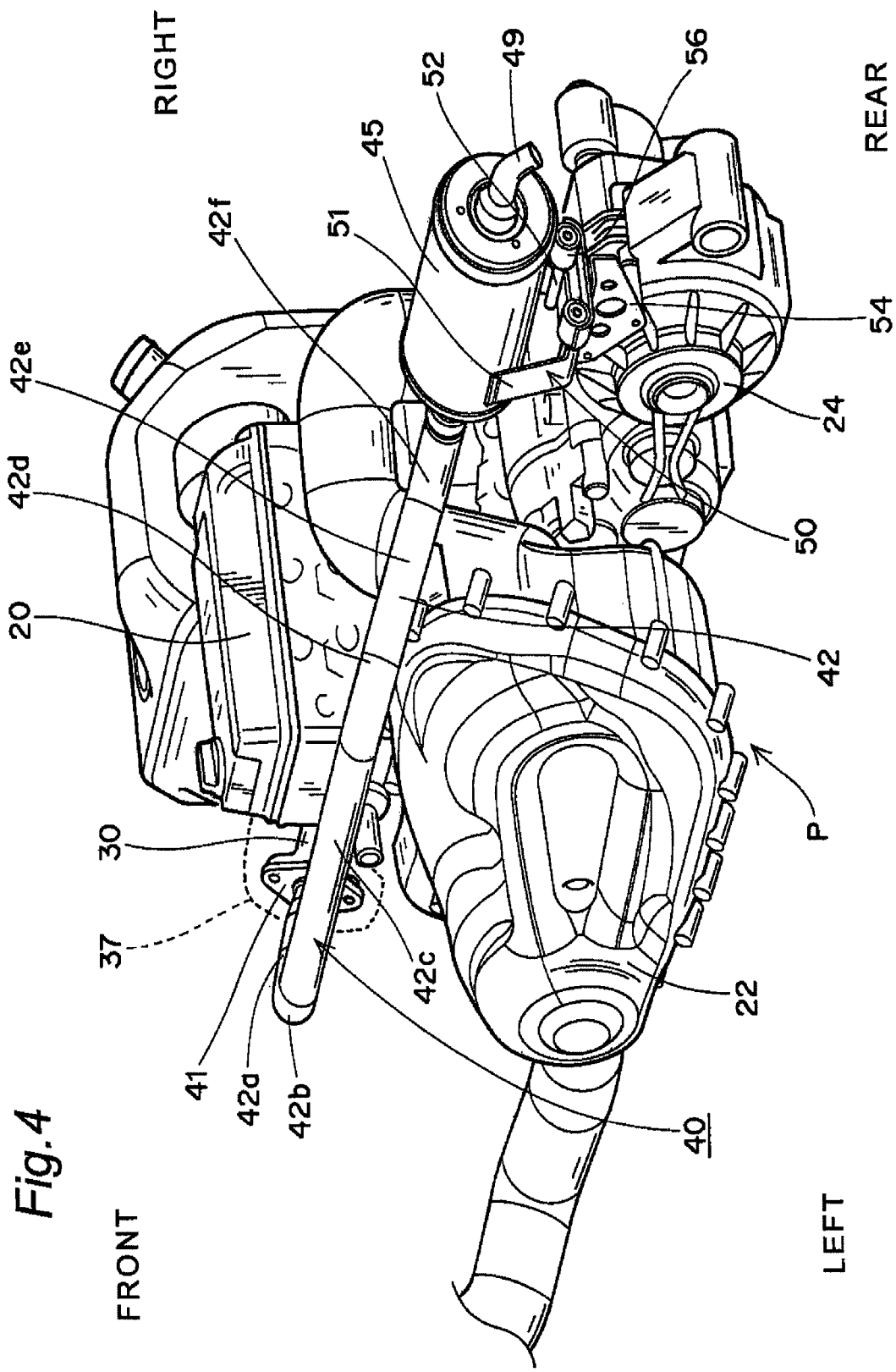
FIG. 4 is a perspective view of a power unit and an exhaust system shown in FIG. 2, viewed from a rear left side.

FIG. 2 is a plan view of the power unit P and the exhaust system 40. FIG. 3 is a left side view of the power unit P and the exhaust system 40. FIG. 4 is a perspective view of the power unit P and the exhaust system 40 viewed from a rear left side. In FIG. 2, the engine 20 is a parallel three-cylinder engine in which three cylinders C1, C2, and C3 are aligned in the vehicle width directions. The gear type transmission 24 is a transmission of manual operation in which a gear change mechanism is provided. The gear type transmission 24 is arranged on a rear side of the engine 20. Then, the engine 20 and the gear type transmission 24 are rigidly connected to each other through a connecting bracket 26 arranged in the frontward and rearward directions between the engine 20 and the gear type transmission 24. Further, the power unit P is provided with a V-belt type continuously variable transmission 22 extending from the left side of the engine 20 to the left side of the gear type transmission 24. Revolution of a crankshaft (having a shaft axis O1) of the engine 20 is changed steplessly by the V-belt type continuously variable transmission 22 and then transmitted to the gear change input shaft of the gear type transmission 24. Here, in the V-belt type continuously variable transmission 22, for the purpose of cooling the pulleys, the V belt, and the like, the front end part is provided with a cooling air inlet duct 22a and the rear end part is provided with a discharge duct 22b through which air having been used in cooling is discharged.

The exhaust system 40 according to the present invention includes: an exhaust manifold 30 attached to a front end surface 21a of a cylinder head 21 of the engine 20 in a manner of being fixed detachably; an exhaust pipe 42 connected to the exhaust downstream end of the exhaust manifold 30; and an exhaust muffler 45 connected to the exhaust downstream end of the exhaust pipe 42.

In FIG. 3, the power unit P is provided with: a front attachment mechanism 23a with damper provided in the front lower end part of the engine 20; a rear attachment mechanism 23b with damper provided in the rear end part of the gear type transmission 24; and a middle attachment mechanism 23c with damper provided in the connecting bracket 26 (shown in FIG. 2). Then, the power unit P is supported on the lower frame member 2a of the rear frame 2 by the three attachment mechanisms 23a, 23b, and 23c. Here, preferably, the front, the rear, and the middle attachment mechanisms 23a, 23b, and 23c are arranged approximately on a straight line extending in the frontward and rearward directions with respect to the vehicle traveling direction.

(Structure of Exhaust Manifold 30)

Figure 5:
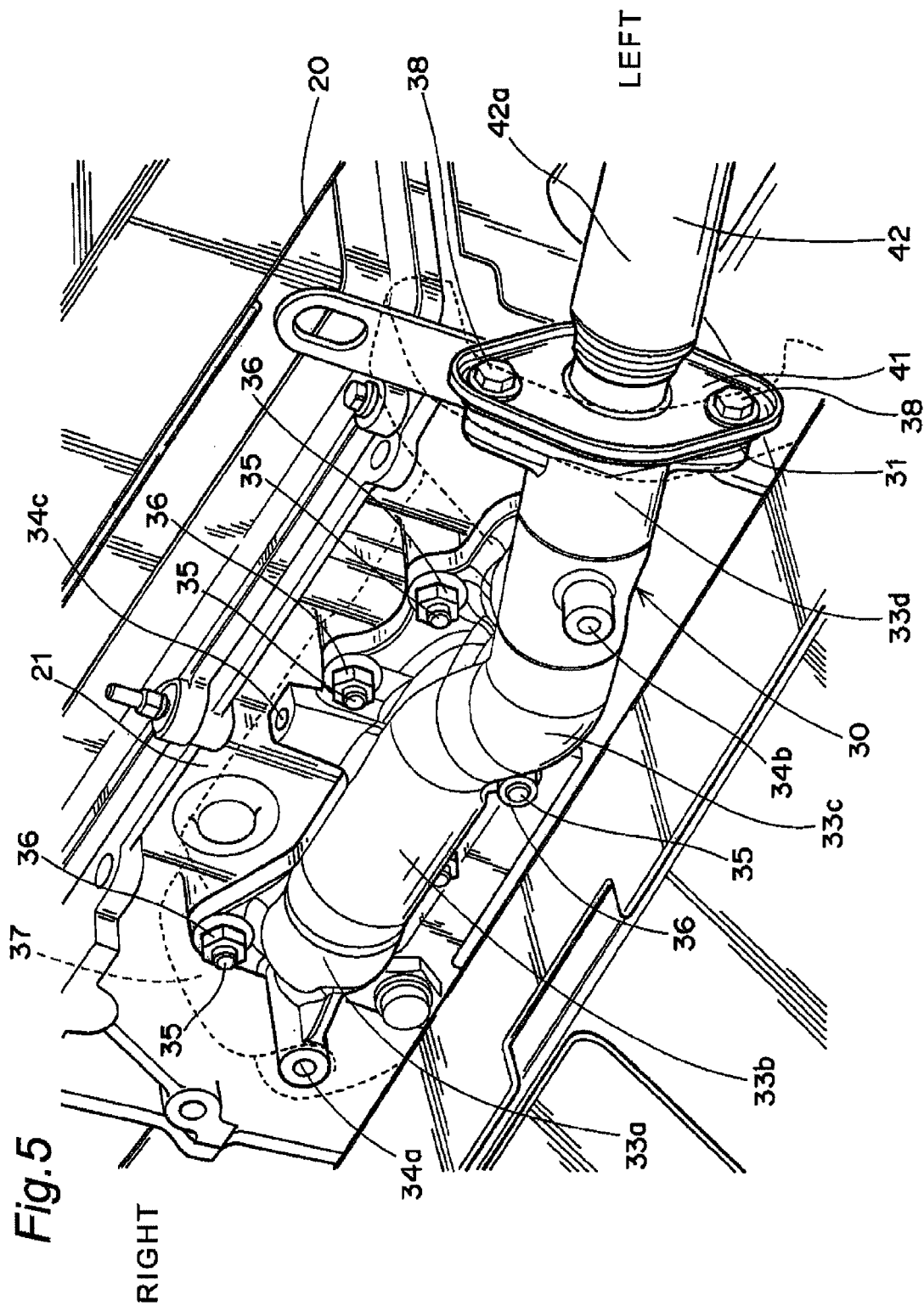
FIG. 5 is a perspective view of an exhaust manifold of an exhaust system shown in FIG. 2, viewed from a front left side.
Figure 6:
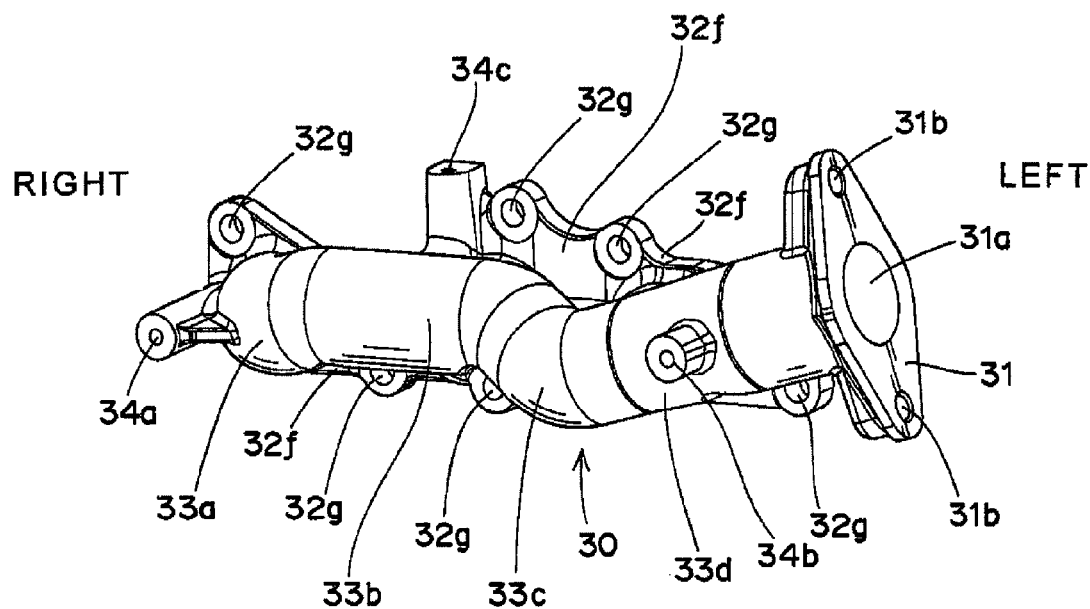
FIG. 6 is a perspective view of an exhaust manifold shown in FIG. 5, in an isolated state.
Figure 7:
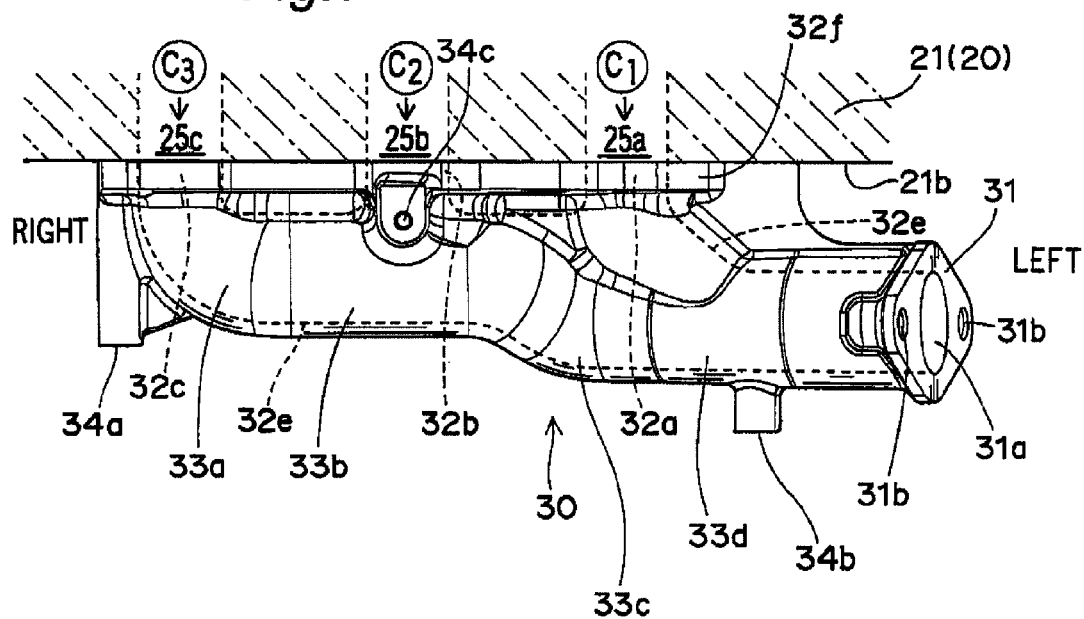
FIG. 7 is a plan view of an exhaust manifold shown in FIG. 6, in an isolated state.
Figure 8:
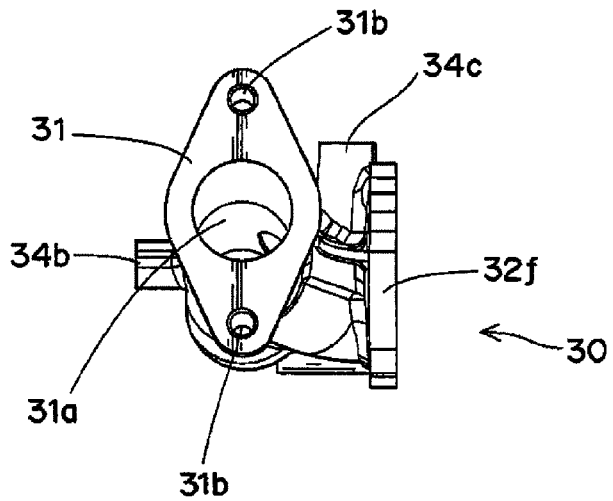
FIG. 8 is a left side view of an exhaust manifold shown in FIG. 6, in an isolated state.
Figure 9:
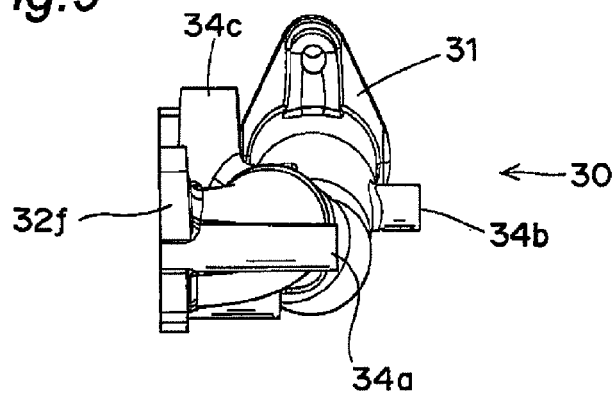
FIG. 9 is a right side view of an exhaust manifold shown in FIG. 6, in an isolated state.
Figure 10:
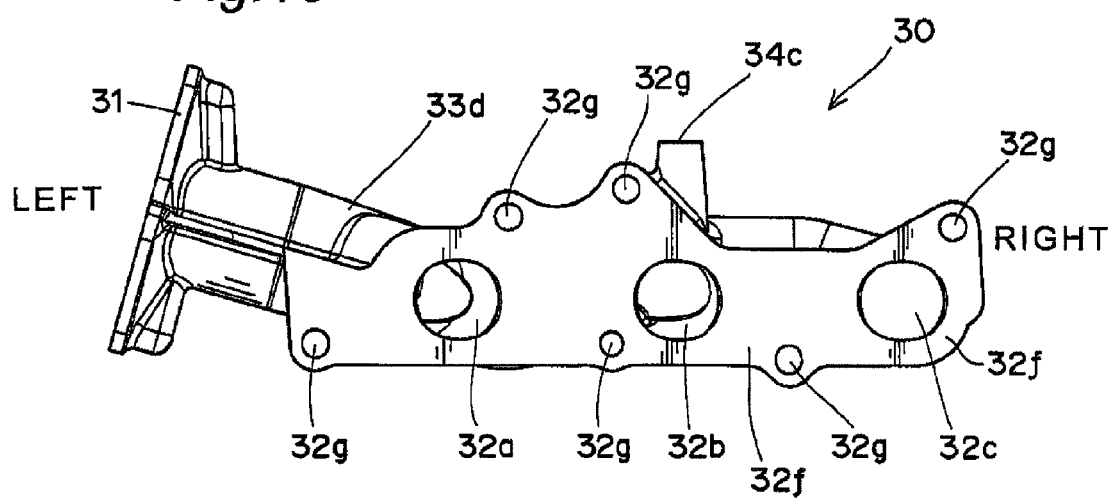
FIG. 10 is a rear view of an exhaust manifold shown in FIG. 6, in an isolated state.

FIG. 5 is a perspective view of the exhaust manifold 30 of the exhaust systems 40 viewed from a front left side. FIG. 6 is a perspective view of the exhaust manifold 30 in an isolated state. FIG. 7 is a plan view of the exhaust manifold 30 in an isolated state. FIG. 8 is a left side view of the exhaust manifold 30 in an isolated state. FIG. 9 is a right side view of the exhaust manifold 30 in an isolated state. FIG. 10 is a rear view of the exhaust manifold 30 in an isolated state. In FIG. 7, in the front end surface 21b of the cylinder head 21 of the engine 20, three exhaust ports 25a, 25b, and 25c for the respective cylinders C1, C2, and C3 are opened approximately at regular intervals in the vehicle width directions. Then, the above-mentioned exhaust manifold 30 is attached here. The inside of the exhaust manifold 30 is provided with: three exhaust passages 32a, 32b, and 32c respectively in fluid communication with the three exhaust ports 25a, 25b, and 25c of the cylinder head 21; and a collective exhaust passage 32e collecting the three exhaust passages 32a, 32b, and 32c and extending leftward almost horizontally.

In FIGS. 6 and 10, the exhaust manifold 30 has a flange 32f formed in the rear end part in an integral manner. In the flange 32f, a plurality of bolt insertion holes 32g are formed.

On the other hand, in FIG. 5, at the front end of the cylinder head 21, a plurality of stud bolts 35 protruding frontward are screwed. Then, the stud bolts 35 are inserted into the respective bolt insertion holes 32g (shown in FIG. 10) of the exhaust manifold 30, and then nuts 36 are screwed on the respective stud bolts 35 so that the exhaust manifold 30 is attached to the front end surface 21b of the cylinder head 21.

In FIG. 7, a body part 33 containing the collective exhaust passage 32e of the exhaust manifold 30 is constructed from: a first curved part 33a having a right end exhaust passage 32c; a first straight line part 33b extending leftward almost horizontally from the first curved part 33a and then reaching a central exhaust passage 32b; a second curved part 33c slightly curved frontward from the first straight line part 33b; and a second straight line part 33d (shown in FIG. 6) extending leftward in a manner of being inclined slightly upward from the second curved part 33c.

In FIG. 6, in the exhaust downstream end part (left end part) of the second straight line part 33d, a flange 31 for exhaust pipe connection is formed. Then, in the flange 31, a pair of upper and lower female screw holes 31b are formed. Further, in the vicinity of the first curved part 33a and in the second straight line part 33d, boss parts 34a and 34b for heat shielding cover attachment are respectively installed in a frontward orientation. In the first straight line part 33b, a boss part 34c for heat shielding cover attachment is installed in an upward orientation. Then, each of the boss parts 34a, 34b, and 34c is provided with a female screw hole. As shown by a dashed line in FIG. 5, a heat shielding cover 37 for covering the frontward side and the upper and lower sides of the exhaust manifold 30 is attached to the above-mentioned boss parts 34a, 34b, and 34c.

(Structure of Exhaust Muffler 45)

Figure 11:
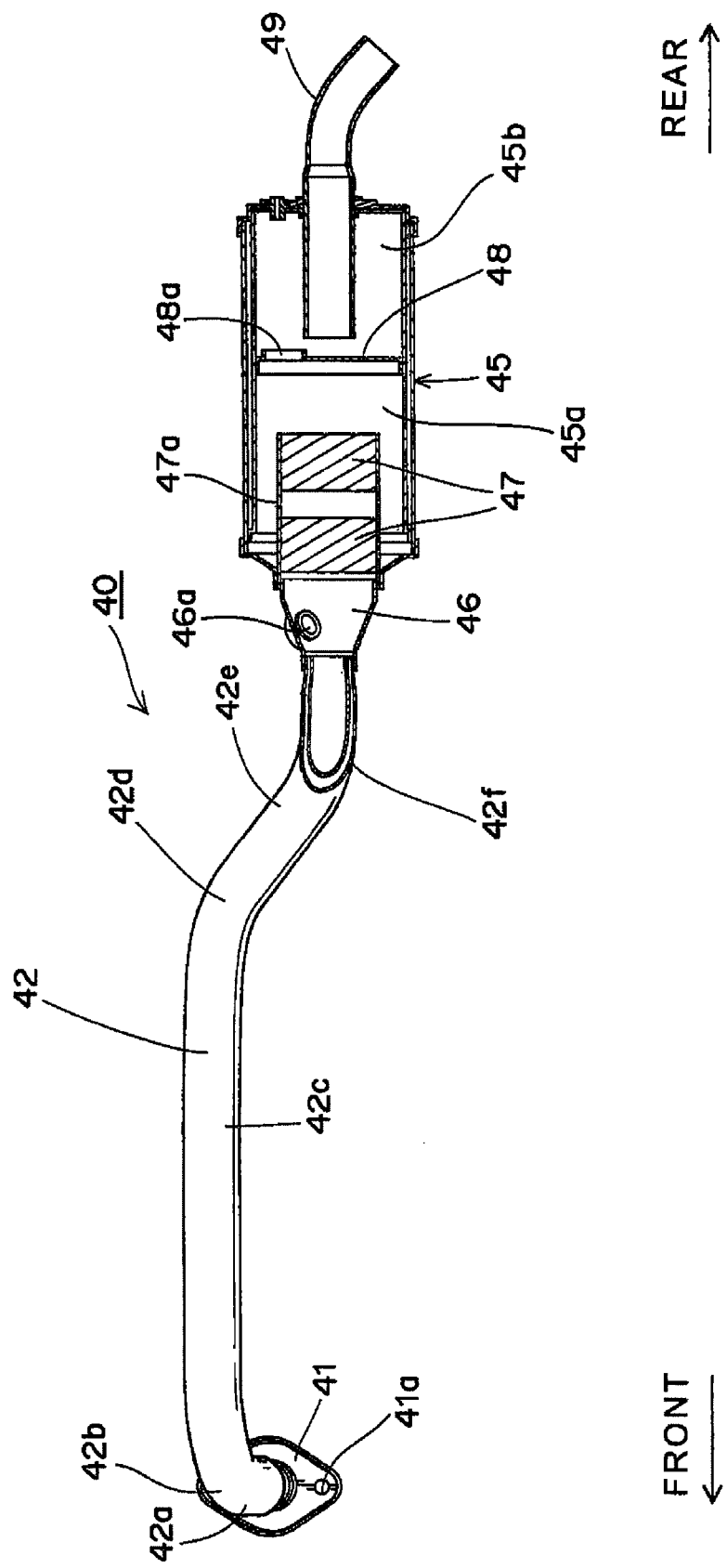
FIG. 11 is a left side view of an exhaust muffler and an exhaust pipe, partly shown in a sectional view.
Figure 12:
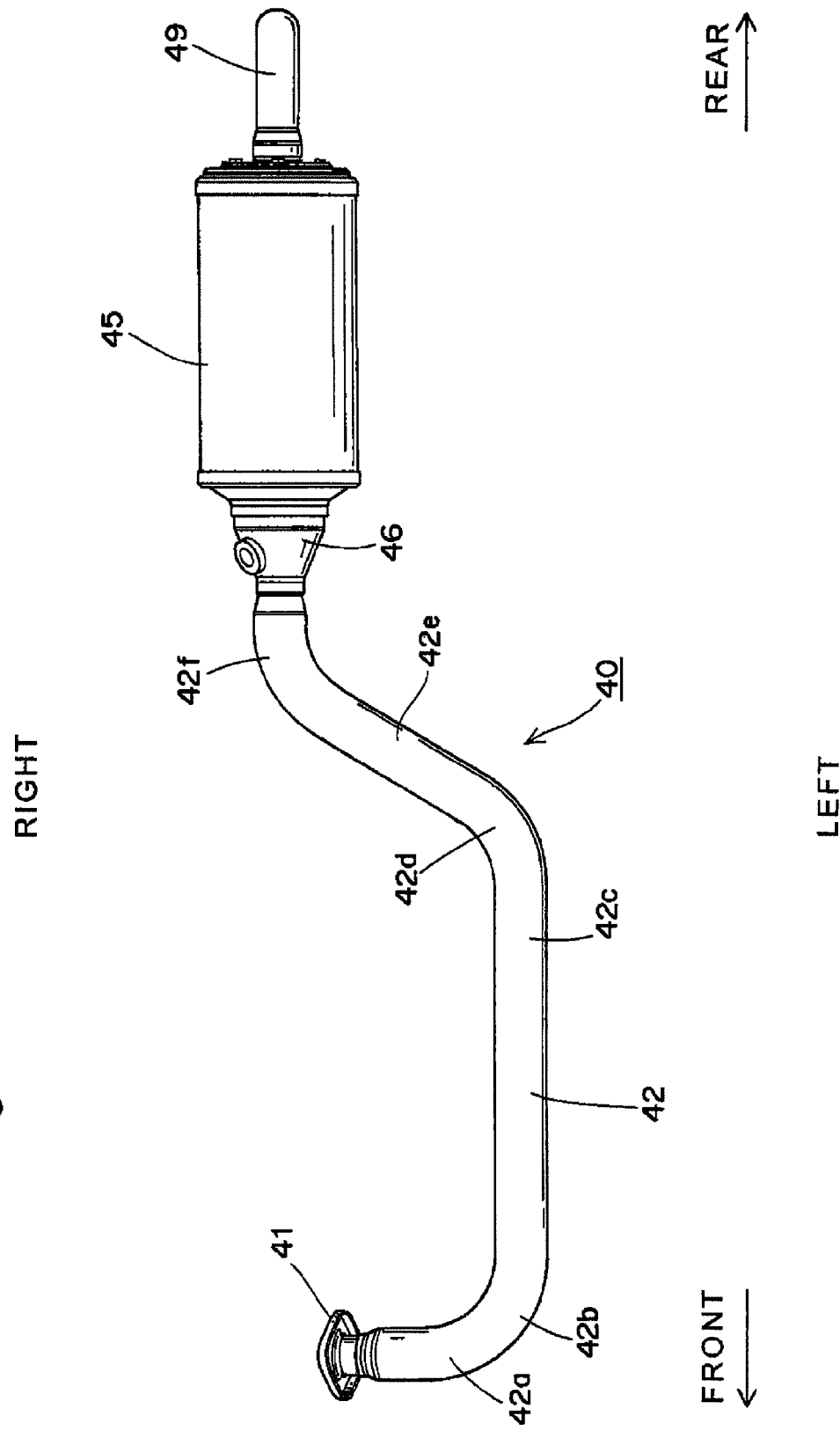
FIG. 12 is a plan view of an exhaust muffler and an exhaust pipe shown in FIG. 11.
Figure 13:
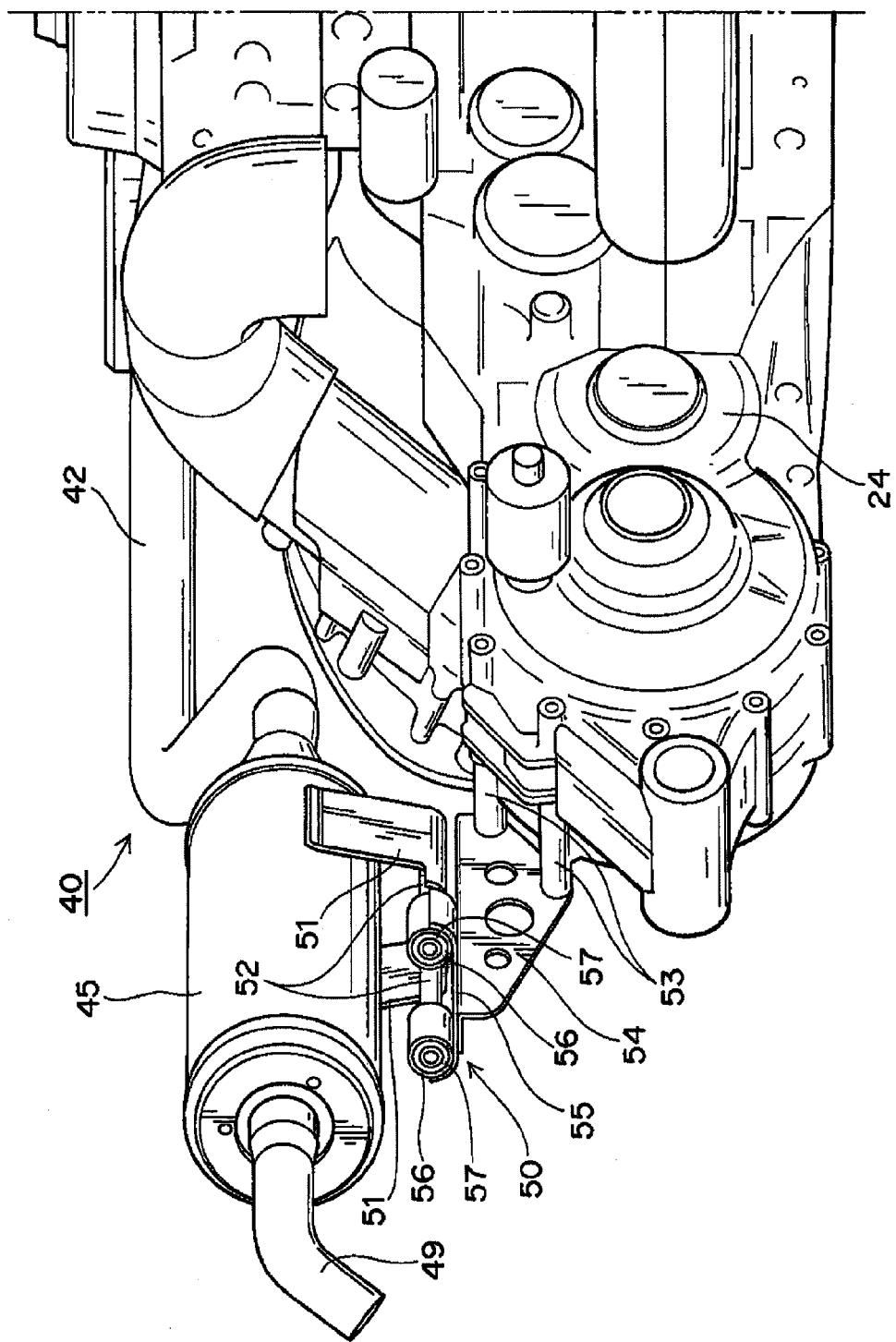
FIG. 13 is a perspective view of an exhaust muffler shown in FIG. 2, viewed from a rear right side.
Figure 14:
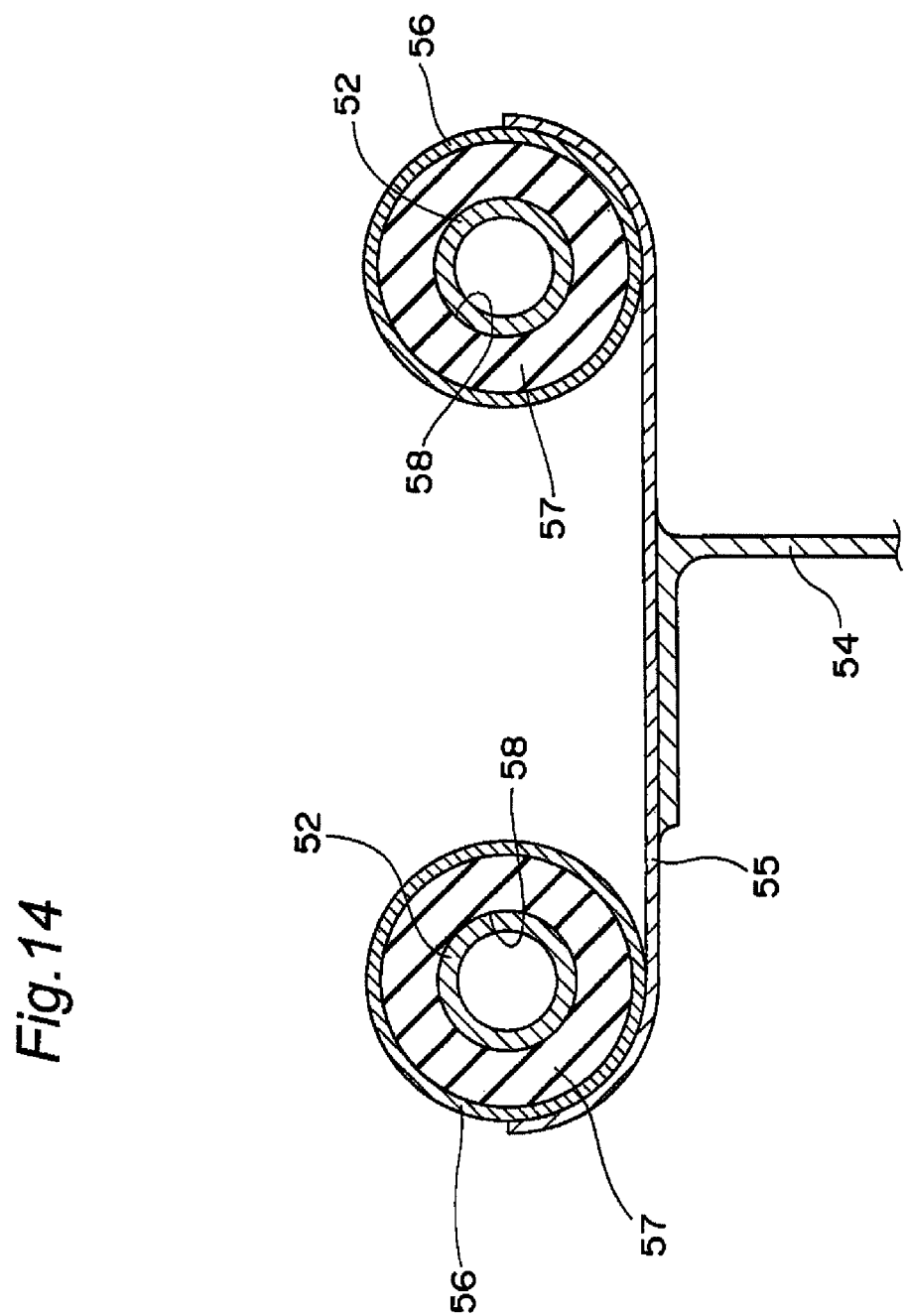
FIG. 14 is a sectional view taken along line XIV-XIV in FIG. 3.

FIG. 11 is a left side view of the exhaust muffler 45 and the exhaust pipe 42 shown in part in a sectional view. FIG. 12 is a plan view of the exhaust muffler 45 and the exhaust pipe 42 shown in FIG. 11. FIG. 13 is a perspective view of the exhaust muffler 45 shown in FIG. 2, viewed from a rear side. FIG. 14 is a sectional view taken along line XIV-XIV in FIG. 3. In FIG. 11, the end part of the exhaust downstream of the exhaust pipe 42 is connected via a cone-shaped connecting pipe 46 to a catalyst mounting pipe 47a. In the inside of the catalyst mounting pipe 47a, a pair of catalyst bodies (for example, honeycomb-structured bodies) 47 are arranged with a gap in between in the frontward and rearward directions. The cone-shaped connecting pipe 46 is provided with a mounting boss part 46a used for attaching an oxygen sensor (not shown).

The inside of the exhaust muffler 45 is divided into a front expansion chamber 45a and a rear expansion chamber 45b by a partition 48. Then, the front expansion chamber 45a and the rear expansion chamber 45b are in fluid communication with each other through a communicating pipe 48b that penetrates the partition 48. A tail pipe 49 is attached to the rear wall of the exhaust muffler 45. The tail pipe 49 extends rearward from the vicinity of the front end part of the rear expansion chamber 45b, then penetrates the rear wall, and then goes obliquely downward in the outside of the exhaust muffler 45. Then, the rear end is opened to the outside.

The catalyst mounting pipe 47a in the rear end part of the exhaust pipe 42 is inserted into the front expansion chamber 45a of the exhaust muffler 45 from a front side. The front end part of catalyst mounting pipe 47, together with the rear end part of connecting pipe 46, is fixed to the front end part of the exhaust muffler 45 in an integral manner by welding or the like. Thus, the exhaust pipe 42 and the exhaust muffler 45 are constructed in an assembled form of the exhaust system 40.

In the exhaust system 40 containing the exhaust pipe 42 and the exhaust muffler 45 having the above-mentioned configuration, the exhaust upstream end part of the exhaust pipe 42 is supported by the exhaust manifold 30 and the exhaust muffler 45 is supported on the gear type transmission 24 by a support mechanism 50. That is, the exhaust system 40 containing the exhaust pipe 42 and the exhaust muffler 45 is supported by the power unit P at two sites consisting of the front end part 42a of the exhaust pipe 42 and of the exhaust muffler 45.

The above-mentioned two support sites are described below in detail. In FIG. 11, in the exhaust pipe 42, the front end part 42a is provided with a flange 41. The flange 41 has a pair of upper and lower bolt insertion holes 41a. As shown in FIG. 5, the flange 41 in the front end part 42a of the exhaust pipe 42 is aligned with the flange 31 of the exhaust manifold 30, and then a pair of upper and lower bolts 38 inserted into the bolt insertion holes 41a (shown in FIG. 11) are screwed into the screw holes 31b (shown in FIGS. 6 to 8) of the flange 31 so that the front end part 42a of the exhaust pipe 42 is connected to and supported by the exhaust manifold 30.

(Supporting Structure 50 for Exhaust Muffler 45)

In the supporting structure 50 for the exhaust muffler 45 shown in FIG. 13, when viewed from a rear left side, a tray-shaped support stay 51 extending almost over the entire width of the exhaust muffler 45 in the vehicle width directions is arranged under the front end part of the exhaust muffler 45. Then, the left and the right upper end parts of the support stay 51 are fixed to the left and the right side faces of the exhaust muffler 45 by welding or the like.

Left and right support pipes (support end parts) 52 and 52 extending horizontally approximately rearward are fixed respectively to the left and the right end parts of the lower end part of the support stay 51 by welding or the like. On the other hand, in the left end part of the rear end of the gear type transmission 24, a pair of front and rear boss parts 53 protruding leftward are formed integrally with the gear type transmission 24. Then, an attachment bracket 54 having an inverted L-shape when viewed from a rear side is fixed to the mounting boss parts 53 with bolts. An attachment plate 55 having a tray shape when viewed from a rear side is fixed to the almost horizontal upper wall of the attachment bracket 54 by welding or the like. Then, in the left and the right end parts of this attachment plate 55, a pair of left and right holding pipes 56 and 56 are respectively fixed at a pitch corresponding to the left and the right support pipes 52 and 52 by welding or the like.

In FIG. 14, left and right damper bushes 57 and 57 composed of elastic cylindrical bodies fabricated from rubber or the like are fixed respectively to the inner peripheral surfaces of the holding pipes 56 and 56 by baking (thermocompression bonding) or the like. The inner diameter of each of the insertion holes 58 and 58 of the left and the right damper bushes 57 and 57 is smaller than the outer diameter of each of the left and the right support pipes 52 and 52 by a suitable press-fit margin. Then, the support pipes 52 and 52 are respectively press-fit into the insertion holes 58 and 58 of the damper bushes 57 and 57. In this state, the left and the right support pipes 52 and 52 are respectively movable relative to the left and the right holding pipes 56 and 56 by a predetermined distance in the frontward and rearward directions against elastic forces of the left and the right damper bushes 57 and 57.

(Overall Shape and Arrangement Position of Exhaust Pipe 42)

In FIG. 2, the exhaust pipe 42 includes: a front end part 42a having the flange 41; a first curved part 42b bent rearward from the front end part 42a; a first straight line part 42c extending approximately horizontally rearward starting at the first curved part 42b, then passing above the V-belt type continuously variable transmission 22, and then going along the left side face of the engine 20 and the gear type transmission 24; a second curved part 42d curved from the rear end part of the first straight line part 42c toward a left rearward direction; a second straight line part 42e extending from the second curved part 42d in an obliquely right rearward direction; and a third curved part 42f curved approximately rearward from the rear end of the second straight line part 42e. The connecting pipe 46 is connected to the rear end of the third curved part 42f.

In FIG. 3, the first straight line part 42c of the exhaust pipe 42 is arranged almost horizontally. In contrast, the first curved part 42b is inclined slightly upward in a leftward direction from the flange 31 (shown in FIG. 5) of the exhaust manifold 30 (shown in FIG. 5). Further, the second straight line part 42e is inclined slightly downward in a rearward direction.

(Modification of Supporting Structure 60 for Exhaust Muffler 45)

Figure 15:
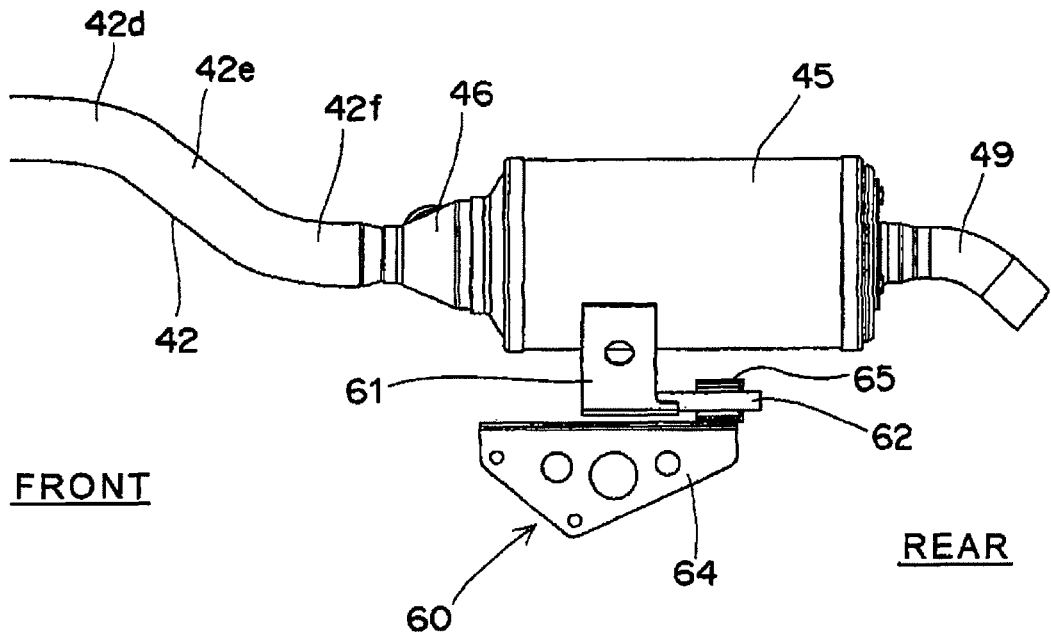
FIG. 15 is a left side view showing a modification of a supporting structure for an exhaust muffler.
Figure 16:
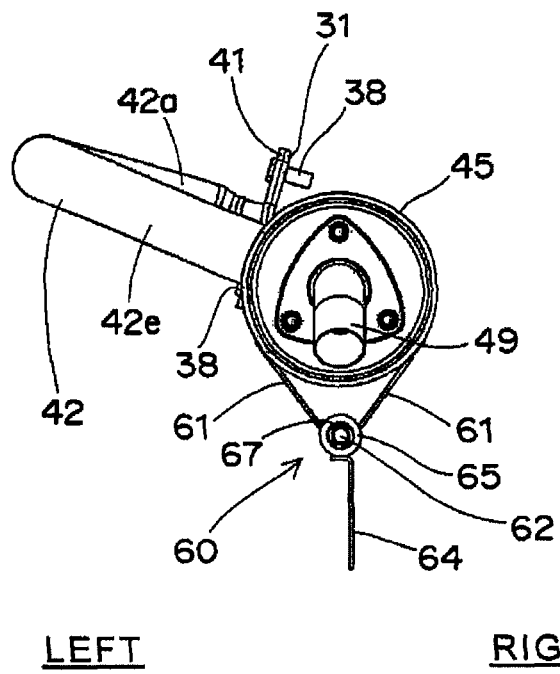
FIG. 16 is a rear view showing a modification of a supporting structure for an exhaust muffler.
Figure 17:
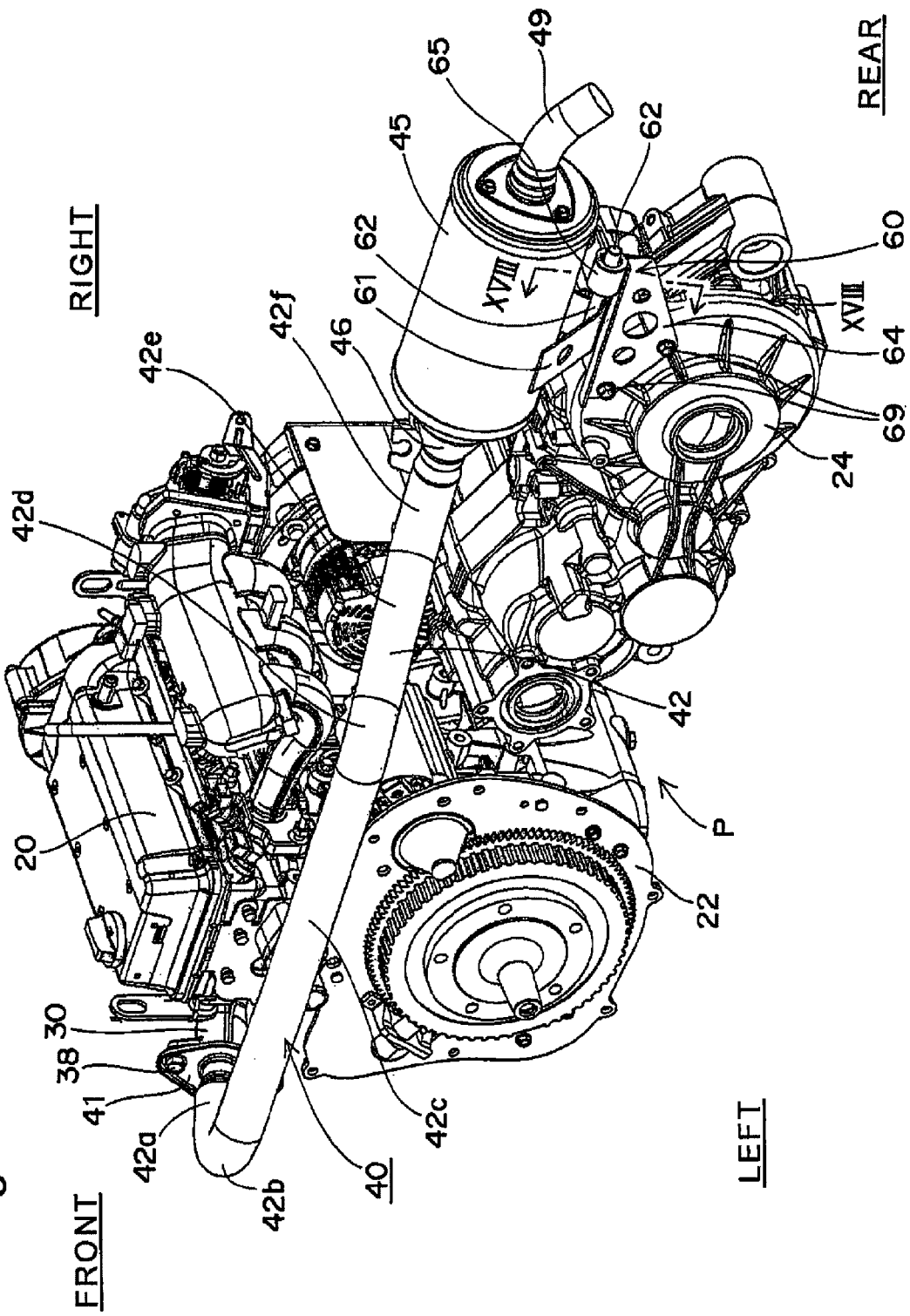
FIG. 17 is a perspective view of an exhaust system having a supporting structure for an exhaust muffler according to a modification and of a power unit, viewed from a rear left side.
Figure 18:
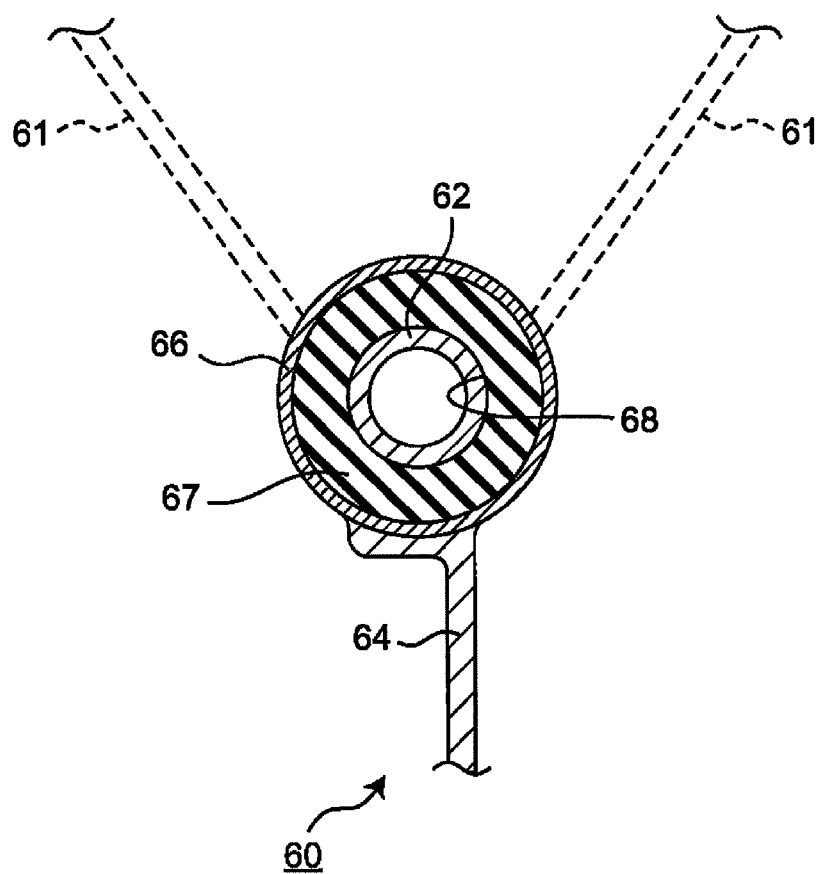
FIG. 18 is a sectional view taken along line XVIII-XVIII in FIG. 17, showing a supporting structure for an exhaust muffler according to a modification.

A modification of a supporting structure 60 for the exhaust muffler 45 is described below with reference to FIGS. 15 to 18. FIG. 15 is a left side view showing a modification of the supporting structure 60 for the exhaust muffler 45. FIG. 16 is a rear view showing a modification of the supporting structure 60 for the exhaust muffler 45. FIG. 17 is a perspective view of an exhaust system 40 having a supporting structure 60 for the exhaust muffler 45 according to a modification and of a power unit P, viewed from a rear left side. FIG. 18 is a sectional view taken along line XVIII-XVIII in FIG. 17, showing the supporting structure 60 for the exhaust muffler 45 according to the modification.

As shown in FIG. 17, the basic configuration of the power unit P and the exhaust system 40 is the same as that shown in FIG. 4 and the like. The supporting structure 60 for the exhaust muffler 45 according to the modification is different from the supporting structure 50 for the exhaust muffler 45 according to the embodiment described above. Thus, the following description is given mainly for the difference. Here, in FIG. 17 showing the modification, reference numerals indicating the individual components such as the power unit P and the exhaust system 40 designate the same ones described in the embodiment given above. Thus, their detailed description is omitted.

As shown in FIGS. 15 and 16, in the supporting structure 60 for the exhaust muffler 45 according to the modification, a tray-shaped support stay 61 for supporting the exhaust muffler 45 at a distance somewhat shorter than the vehicle-width directional length of the exhaust muffler 45 is arranged under the front end part of the exhaust muffler 45. Then, the left and the right upper end parts of the support stay 61 are fixed to the left and the right side faces of the exhaust muffler 45 by welding or the like.

As shown in FIG. 15, one support pipe (support end part) 62 extending horizontally approximately rearward is fixed to the end part of the lower end part of the support stay 61 by welding or the like. Similarly to the embodiment described above, in the left end part of the rear end of the gear type transmission 24 (shown in FIG. 17), a pair of front and rear boss parts (not shown) protruding leftward are formed integrally with the gear type transmission 24. Then, an attachment bracket 64 having an inverted L-shape when viewed from a rear side is fixed to the mounting boss parts with bolts 69. As shown in FIG. 18, one holding pipe 66 is fixed on the almost horizontal upper wall of the attachment bracket 64 by welding or the like.

In FIG. 18, one damper bush 67 composed of an elastic cylindrical body fabricated from rubber or the like is fixed to the inner peripheral surface of a holding pipe 66 by baking (thermocompression bonding) or the like. The inner diameter of an insertion hole 68 in a damper bush 67 is smaller than the outer diameter of a support pipes 62 by a suitable press-fit margin. Then, the support pipe 62 is press-fit into the insertion hole 68 of the damper bush 67. In this state, the support pipe 62 is movable relative to the holding pipes 66 by a predetermined distance in the frontward and rearward directions against an elastic force of the damper bush 67.

As such, the supporting structure 60 for the exhaust muffler 45 according to the modification includes one support pipe 62, one holding pipe 66, and one damper bush 67. Thus, according to this configuration, the number of components constituting the supporting structure 60 is reduced, and so is the number of points to be fixed by welding or the like.

(Operation Effect of Embodiments)

(1) The exhaust muffler 45 connected integrally to the exhaust pipe 42 is supported by the gear type transmission 24. Thus, the exhaust pipe 42 and the exhaust muffler 45 vibrate in approximately the same phase as the gear type transmission 24. This reduces the relative vibration amplitude of the exhaust pipe 42 and the exhaust muffler 45.

(2) Vibrations in the up and down directions are absorbed by the thicknesses of the damper bushes 57 and 57 (67) in the diameter direction. At the same time, vibrations in the frontward and rearward directions with respect to the vehicle traveling direction are absorbed by the relative frontward and rearward movement of the support pipes 52 and 52 (62) press-fit into the damper bushes 57 and 57 (67) in the frontward and rearward directions with respect to the vehicle traveling direction.

(3) The front end part 42a of the exhaust pipe 42 is supported by the exhaust manifold 30 fixed to the cylinder head 21 of the engine 20. Thus, supporting of the exhaust pipe 42 is achieved by the support member of necessary minimum material. This reduces the number of necessary attachment parts.

(4) The exhaust system 40 in which the exhaust muffler 45 and the exhaust pipe 42 are connected integrally to each other is supported by the power unit P in which the engine 20 and the gear type transmission 24 are rigidly connected to each other. Thus, the exhaust pipe 42 and the exhaust muffler 45 vibrate in approximately the same phase as the integral unit of the engine 20 and the gear type transmission 24. This reduces the relative vibration amplitude of the exhaust pipe 42 and the exhaust muffler 45.

(5) The exhaust pipe 42 is arranged such as to extend along the upper part of the V-belt type continuously variable transmission 22 and hence the position of the exhaust pipe 42 is located high. This avoids entering of water from the outside into the exhaust pipe 42 and further permits suitable arrangement of the exhaust system 40 in a state that the length of the exhaust pipe 42 is ensured appropriately.

(6) The engine 20 is a parallel multiple cylinder engine in which a plurality of cylinders C1, C2, and C3 are aligned in the vehicle width directions. Thus, in an engine having such a structure, the exhaust pipe 42 is arranged compactly.

Here, the present invention is not limited to the detailed configurations of the embodiments described above and may include various kinds of modifications unless not departing from the scope described in the claims.

The invention claimed is:

1. A supporting structure for an exhaust system of a vehicle employed in an exhaust system of a vehicle including at least: an engine; a transmission arranged on a rear side in a vehicle traveling direction relative to the engine; an exhaust pipe connected to the engine and discharging exhaust gas; and an exhaust muffler connected to a downstream end part of the exhaust pipe, said supporting structure comprising:

an exhaust muffler support member for elastically supporting the exhaust muffler on the transmission, the exhaust muffler support member to be arranged and located between the transmission and the exhaust muffler, the exhaust muffler support member including:

a support stay to be attached to the exhaust muffler so as to support the exhaust muffler from an under side, the support stay having a support end part extending from a rear end part of the support stay toward a rear side in the vehicle traveling direction;

an elastic cylindrical body extending in the vehicle traveling direction and having an insertion hole into which the support end part of the support stay is inserted; and a transmission mounting bracket to be attached to the transmission and having a holding part for holding the elastic cylindrical body.

2. The supporting structure for the exhaust system of the vehicle according to claim 1, wherein
an exhaust upstream end of the exhaust pipe is connected to and supported by an exhaust downstream end of an exhaust manifold connected to an exhaust port of the engine.

3. The supporting structure for the exhaust system of the vehicle according to claim 1, wherein
the engine is integrally connected via a connecting member to the transmission.

4. The supporting structure for the exhaust system of the vehicle according to claim 1, wherein
the exhaust pipe extends along an upper part of a V-belt type continuously variable transmission so that the exhaust pipe does not interfere with the V-belt type continuously variable transmission arranged on a side of the engine and the transmission.

5. The supporting structure for the exhaust system of the vehicle according to claim 1, wherein
the engine is a parallel multiple cylinder engine in which a plurality of cylinders are aligned in a vehicle width direction.

6. An exhaust system for a vehicle including an engine and a transmission arranged at a rear side of the vehicle in a vehicle traveling direction relative to the engine, said exhaust system comprising:

an exhaust pipe connected to the engine for discharging exhaust gas;

an exhaust muffler connected to a downstream end part of the exhaust pipe; and a supporting structure for supporting the exhaust system, the supporting structure including an exhaust muffler support member for elastically supporting the exhaust muffler on the transmission, the exhaust muffler support member to be arranged and located between the transmission and the exhaust muffler, the exhaust muffler support member including:

a support stay attached to the exhaust muffler so as to support the exhaust muffler from an under side, the support stay having a support end part extending from a rear end part of the support stay toward a rear side in the vehicle traveling direction;

an elastic cylindrical body extending in the vehicle traveling direction and having an insertion hole into which the support end part of the support stay is inserted; and a transmission mounting bracket attached to the transmission and having a holding part for holding the elastic cylindrical body.

7. The exhaust system for the vehicle according to claim 6, wherein
an exhaust upstream end of the exhaust pipe is connected to and supported by an exhaust downstream end of an exhaust manifold to be connected to an exhaust port of the engine.

8. The exhaust system for the vehicle according to claim 6, wherein
the exhaust pipe is to extend along an upper part of a V-belt type continuously variable transmission so that the exhaust pipe does not interfere with the V-belt type continuously variable transmission arranged on a side of the engine and the transmission.

9. A vehicle comprising:

an engine;

a transmission arranged at a rear side of the vehicle in a vehicle traveling direction relative to the engine; and an exhaust system including:

an exhaust pipe connected to the engine for discharging exhaust gas;

an exhaust muffler connected to a downstream end part of the exhaust pipe; and a supporting structure for supporting the exhaust system, the supporting structure including an exhaust muffler support member elastically supporting the exhaust muffler on the transmission, the exhaust muffler support member being arranged and located between the transmission and the exhaust muffler, the exhaust muffler support member including:

a support stay attached to the exhaust muffler so as to support the exhaust muffler from an under side, the support stay having a support end part extending from a rear end part of the support stay toward a rear side in the vehicle traveling direction;

an elastic cylindrical body extending in the vehicle traveling direction and having an insertion hole into which the support end part of the support stay is inserted; and a transmission mounting bracket attached to the transmission and having a holding part for holding the elastic cylindrical body.

10. The vehicle according to claim 9, wherein
an exhaust upstream end of the exhaust pipe is connected to and supported by an exhaust downstream end of an exhaust manifold connected to an exhaust port of the engine.

11. The vehicle according to claim 9, wherein
the engine is integrally connected via a connecting member to the transmission.

12. The vehicle according to claim 9, wherein
the exhaust pipe extends along an upper part of a V-belt type continuously variable transmission so that the exhaust pipe does not interfere with the V-belt type continuously variable transmission arranged on a side of the engine and the transmission.

13. The vehicle according to claim 9, wherein
the engine is a parallel multiple cylinder engine in which a plurality of cylinders are aligned in vehicle width directions.

* * * * *